(12) United States Patent
Shimizu et al.

(10) Patent No.: US 6,816,314 B2
(45) Date of Patent: Nov. 9, 2004

(54) HEAD-MOUNTED IMAGE DISPLAY APPARATUS

(75) Inventors: Yoshie Shimizu, Ibaraki (JP); Yasushi Tanijiri, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 352 days.

(21) Appl. No.: 09/949,347

(22) Filed: Sep. 7, 2001

(65) Prior Publication Data

US 2002/0030639 A1 Mar. 14, 2002

(30) Foreign Application Priority Data

Sep. 11, 2000 (JP) .......................................... 2000-274762

(51) Int. Cl.⁷ ............................................. G02B 27/14
(52) U.S. Cl. ........................................ 359/630; 345/7
(58) Field of Search ................................ 359/630, 631, 359/632, 633, 636, 637, 638, 639, 640, 819; 345/7, 8, 9; 351/41

(56) References Cited

U.S. PATENT DOCUMENTS

| | | | | |
|---|---|---|---|---|
| 5,384,654 A | * | 1/1995 | Iba | .............................. 359/364 |
| 5,661,603 A | * | 8/1997 | Hanano et al. | ............. 359/622 |
| 5,699,194 A | | 12/1997 | Takahashi | .................... 359/633 |
| 5,754,344 A | * | 5/1998 | Fujiyama | ..................... 359/631 |
| 5,886,822 A | | 3/1999 | Spitzer | ........................ 359/630 |
| 6,023,372 A | | 2/2000 | Spitzer et al. | .............. 359/630 |
| 6,094,241 A | | 7/2000 | Yamazaki | ..................... 349/11 |
| 6,396,463 B1 | * | 5/2002 | Tomono | ........................ 345/8 |
| 2001/0055152 A1 | * | 12/2001 | Richards | ..................... 359/462 |

FOREIGN PATENT DOCUMENTS

| | | | | |
|---|---|---|---|---|
| JP | 408160344 A | * | 6/1996 | ........... G02B/27/02 |
| JP | 09-185009 A | | 7/1997 | |

* cited by examiner

Primary Examiner—Ricky Mack
(74) Attorney, Agent, or Firm—Sidley Austin Brown & Wood LLP

(57) ABSTRACT

An I image display apparatus has a display portion that displays an optical image, a combiner that reflects light from said display portion to thereby enlarge an optical image represented by the light, and transmits light from an ambient object; and a display unit including a transparent plate-form holding member that holds said combiner. The image display apparatus is used with the combiner situated in front of a user's eye, and provides an enlargement of the optical image displayed by the display portion, so as to be superimposed on an optical image of the ambient object. And the transparent plate-form diopter adjusting member is provided that has an optical power and is attached to the display unit so as to be situated between the eye and the holding member.

24 Claims, 4 Drawing Sheets

HEAD-MOUNTED IMAGE DISPLAY APPARATUS

RELATED APPLICATION

This application is based on application No. 2000-274762 filed in Japan, the content of which is hereby incorporated by reference.

1. Field of the Invention

The present invention relates to an image display apparatus that is used in front of an use's face and provides an optical image so as to be superimposed on an image formed by an ambient object.

2. Description of the Prior Art

In recent years, an image display apparatus that is mounted on the head so as to be situated in front of the face and provides an optical image so as to be superimposed on the optical image of the ambient object by directing the light representing the displayed optical image to the eye together with the light from the ambient object has been proposed as personal information supplying means. This type of apparatus usually has a glasses-like shape, and the user can use the apparatus on all occasions in daily life. For example, the user can view an optical image even while walking.

The display that displays an optical image is situated in a peripheral part of the apparatus so as not to obstruct the users view. To superimpose an optical image on the optical image of the ambient object, it is necessary to direct the light from the display situated in a peripheral part to in front of the eye and change the optical path there so that the light is incident on the eye from before. It is desirable that the optical image displayed on the small display can be viewed being enlarged. For these, a combiner is used that transmits the light from the ambient object without acting thereon and reflects the light from the display to thereby enlarge the optical image represented by the light. The combiner is held by a transparent plate-form holding member that is like a normal lens for glasses.

However, the conventional optical image display apparatus is provided with glasses-like shape merely to make the apparatus easy-to-wear, and the holding member has no optical power. Therefore, when a nearsighted or farsighted person wearing glasses in daily life wears the optical image display apparatus instead of the glasses, the nearsightedness or the farsightedness cannot be corrected, so that the person cannot view the optical image of the ambient object clearly. That is, the conventional optical image display apparatus can be used only by persons having normal eyesight or wearing contact lenses for vision correction.

SUMMARY OF THE INVENTION

An object of the present invention is to provide an improved optical image display apparatus.

Another object of the present invention is to provide an optical image display apparatus that can also be used by persons wearing glasses in daily life.

The above-mentioned objects are attained by an optical image display apparatus having the following structure:

In an optical image display apparatus comprising: a display portion that displays an optical image; a combiner that reflects light from the display portion to thereby enlarge an optical image represented by the light, and transmits light from an ambient object; and a display unit including a transparent plate-form holding member that holds the combiner, said optical image display apparatus being used with the combiner situated in front of a user's eye, and providing an enlargement of the optical image displayed by the display portion, so as to be superimposed on an optical image of the ambient object, a transparent plate-form diopter adjusting member is provided that has an optical power and is attached to the display unit so as to be situated between the eye and the holding member.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Figure 1:
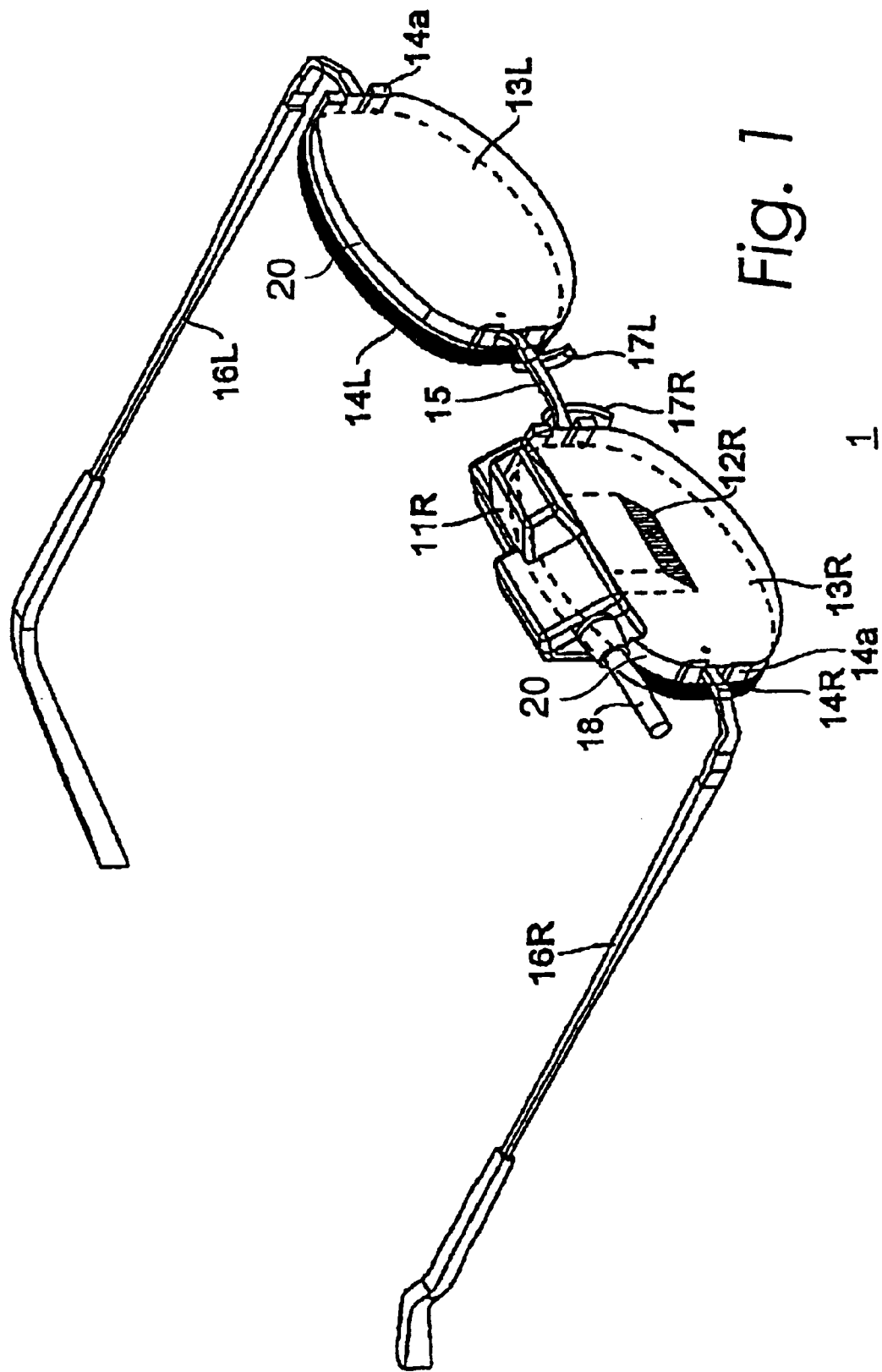
FIG. 1 is a perspective view of an optical image display apparatus according to a first embodiment.

Hereinafter, optical image display apparatuses according to embodiments of the present invention will be described.

An optical image display apparatus according to an embodiment of the present invention has the following structure:

In an optical image display apparatus being provided with: a display portion that displays an optical image; a combiner that reflects the light from the display portion to thereby enlarge the optical image represented by the light, and transmits the light from the ambient object; and a display unit including a transparent plate-form holding member that holds the combiner, being used with the combiner situated in front of the users eye, and providing an enlargement of the optical image displayed on the display portion, so as to be superimposed on the optical image of the ambient object, a transparent plate-form diopter adjusting member is provided having an optical power and attached to the display unit so as to be situated between the eye and the holding member.

The provision of the diopter adjusting member enables persons having poor eyesight such as nearsighted persons or farsighted persons to use the apparatus. Further, since the diopter adjusting member situated between the eye and the holding member acts equally on the light from the ambient object transmitted by the combiner and the holding member and on the light from the display portion reflected by the combiner, the reflection characteristic of the combiner can be set without the need to consider the optical power of the diopter adjusting member, so that manufacture is easy. It is necessary for the optical power of the diopter adjusting member only to be set in accordance with the user's visual power. The holding member and the diopter adjusting member may have arbitrary shapes. For example, when the optical image display apparatus is structured as a head-mounted-type apparatus, they may have shapes of normal lenses for glasses.

An optical image display apparatus according to another embodiment of the present invention has the following structure: In an optical image display apparatus being provided with: a display portion that displays an optical image; a combiner that reflects the light from the display portion to thereby enlarge the optical image represented by the light, and transmits the light from the ambient object; and a display unit including a transparent plate-form holding member that holds the combiner, being used with the combiner situated in front of the user's eye, and providing an enlargement of the optical image displayed on the display portion, so as to be superimposed on the optical image of the ambient object, the holding member has an optical power. By giving an optical power to the holding member, the optical image display apparatus can also be used by persons having poor eyesight. The optical power may be given either to the front surface (the surface farther from the eye) or to the rear surface (the surface closer to the eye) of the holding member, or may be given to both of the surfaces. When the front surface has an optical power, although there are cases where there is a difference between the action on the light from the ambient object and that on the light from the display portion, the difference can be canceled out by appropriately setting the reflection characteristic of the combiner. When only the rear surface has an optical power, the action on the light from the ambient object and that on the light from the display portion are the same, so that it is easy to set the reflection characteristic of the combiner.

In this structure, a transparent plate-form diopter adjusting member having an optical power and attached to the display unit so as to be situated between the eye and the holding member may be provided. By providing the diopter adjusting member, the diopter adjusting function of the holding member can be enhanced or corrected by the diopter adjusting member, so that it is unnecessary for the optical power of the holding member to be completely fitted for the user's visual power. That is, the apparatus is made suitable for a plurality of persons only by attaching a diopter adjusting member of a different optical power to display unit of the same structure, so that manufacturing efficiency increases.

In the structure having the diopter adjusting member, the diopter adjusting member has substantially the same outside shape as the holding member and coincides with substantially the entire area of the holding member. The optical power can be made to act on all parts of the light from the ambient object transmitted by the holding member to reach the eye, so that all parts of the optical image of the ambient object can be viewed clearly. In addition, the appearance of the entire apparatus is enhanced.

The diopter adjusting member may be detachably attachable to the display unit. With this, only by preparing diopter adjusting members of different optical powers, the apparatus can be made suitable for a plurality of persons by use of a display unit of the same structure. In the structure in which the holding member has no optical power, it is possible to combine the display unit and ordinary glasses into a complete apparatus and use the lenses of the glasses as the diopter adjusting member. This enables the user to view an optical image only by attaching the glasses he usually wears to the display unit.

The holding member and the diopter adjusting member are separated from each other. This enables the curvature of the rear surface of the holding member and that of the front surface of the diopter adjusting member to be set independently of each other, so that design of these members are facilitated.

A hologram element is used as the combiner. It is easy to manufacture a hologram element that has a desired reflection characteristic and hardly acts on light it transmits, and the light from the ambient object and the light from the display portion can be directed to the eye with efficiency and the enlargement ratio of the optical image of the display portion can be set arbitrarily. Consequently, a bright ambient object optical image and a bright optical image can be provided, and a large optical image can be provided even though the display portion is small.

A structure may be used in which the holding member allows the light from the display portion to enter from an end and directs the light to the combiner by reflecting it at at least one of the opposing surfaces thereof. In this structure, the light from the ambient object can reliably be prevented from being intercepted by the display portion by disposing the display portion in the periphery of the holding member. The light from the display portion entering the holding member may be totally reflected at a surface of the holding member or a film that transmits the light from the ambient object and reflects the light from the display portion may be provided on a surface of the holding member. In the former case, the total reflection can be caused reliably by separating the holding member and the diopter adjusting member. By directing the light from the display portion to the combiner while causing it to be reflected a plurality of times inside the holding member, the holding member can be increased in size and decreased in thickness.

A mount member may be provided that is supported by the users head and supports the display unit so that the combiner is situated in front of the eye. This makes the apparatus a head-mounted apparatus, so that it is unnecessary for the user to hold the apparatus with his hands.

Further, embodiments of the optical image display apparatus of the present invention will be described in detail with reference to the drawings.

The appearance of an optical image display apparatus 1 according to a first embodiment is shown in FIG. 1. The optical image display apparatus 1 is provided with: a display portion 11R that displays an optical image; a combiner 12R that transmits the light from the ambient object and reflects the light from the display portion 11R so that these lights are superimposed on each other; holding members comprising a pair of first transparent plates 13L and 13R that are transparent and have a plate form; diopter adjusting members comprising a pair of second transparent plates 14L and 14R that are transparent and have a plate form; a connection 15 that connects the first transparent plates 13L and 13R; a pair of temples 16L and 16R; and a pair of nosepieces 17L and 17R.

The optical image display apparatus 1 has an approximately glasses-like shape as a whole, and is mounted on the head so that the first transparent plates 13L and 13R face the left and the right eyes, respectively, like glasses. The temples 16L and 16R are attached to ends of the transparent plates 13L and 13R, respectively. The nosepieces 17L and 17R are attached to the connection 15. The temples 16L and 16R and the nosepieces 17L and 17R are mount members that are supported by the head and supports the transparent plates 13L and 13R. The display portion 11R, the combiner 12R, the second transparent plates 14L and 14R are indirectly supported through the first transparent plates 13L and 13R.

The display portion 11R, the combiner 12R and the transparent plate 13R constitute a display unit that provides an optical image so as to be superimposed on the optical image of the ambient object. The display portion 11R is fixed to the upper end of the transparent plate 13R. When the optical image display apparatus 1 is worn, the display portion 11R is situated outside the users visual field and never obstructs the users view. The operation of the display portion 11R is controlled by a controller (not shown) connected through a cable 18. The combiner 12R is a rectangular film and is disposed inside the transparent plate 13R in the vicinity of the center thereof. The transparent plate 13R functions as a holding member that holds the combiner 12R, and situates the combiner 12R immediately in front of the right eye when the optical image display apparatus 1 is worn. The combiner 12R is inclined with respect to the surface of the transparent plate 13R. When the optical image display apparatus 1 is worn, the lower end of the combiner 12R is closer to the face than the upper end thereof.

The transparent plates 13L and 13R are close to elliptical in outside shape like normal lenses for glasses, and have a size corresponding to substantially the entire area of the visual field. The transparent plates 14L and 14R have substantially the same outside shape and size as the transparent plates 13L and 13R. The transparent plates 14L and 14R are situated between the user's eyes and the transparent plates 13L and 13R, and coincide with substantially the entire areas of the transparent plates 13L and 13R. The transparent plates 13L and 13R, the front surfaces (the surfaces farther from the eyes) and the rear surfaces (the surfaces closer to the eyes) of which are flat surfaces parallel to each other, have no optical power. The transparent plates 14L and 14R, either the front or the rear surfaces or both surfaces of which are curved, have an optical power. The transparent plates 14L and 14R are attached to the transparent plates 13L and 13R.

Figure 2:
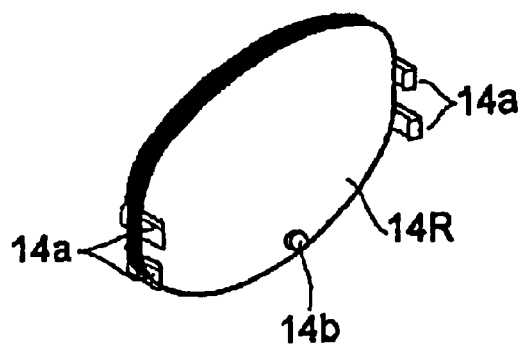
FIG. 2 is a perspective view of a second transparent plate of the optical image display apparatus according to the first embodiment.

The appearance of the transparent plate 14R is shown in FIG. 2. On each of the left and the right ends of the transparent plate 14R, two claws 14a protruding forward and the tips of which swell inward are provided. The claws 14a have a slight elasticity, and are capable of slightly bending outside. In the vicinity of the lower end of the front surface of the transparent plate 14R, a small protrusion 14b is provided. The transparent plate 14R is attached to the transparent plate 13R by engaging the claws 14a with the left and the right ends of the transparent plate 13R. Thus, the transparent plate 14R is detachably attached to the transparent plate 13R. The transparent plate 14L has a similar structure to the transparent plate 14R, and is detachably attachable to the transparent plate 13L.

Figure 3:
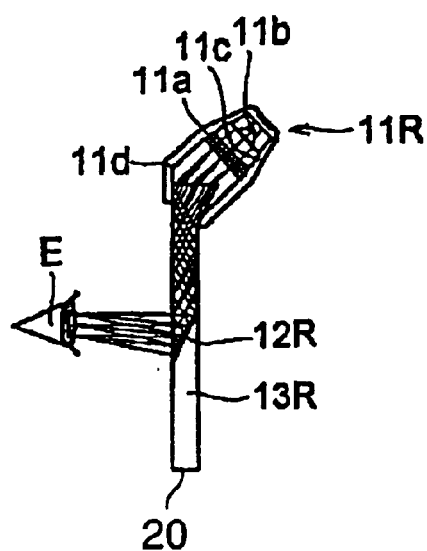
FIG. 3 is a cross-sectional view of the optical image display apparatus according to the first embodiment when the second transparent plate is not attached.

The cross sections of the transparent plate 13R and the display portion 11R when the transparent plate 14R is not attached are shown in FIG. 3. The display portion 11R comprises a transmissive liquid crystal display (LCD) 11a, a light emitting diode (LED) 11b, a lens 11c and a box 11d housing these elements. The LED 11b emits light of a predetermined wavelength for illuminating the LCD 11a. The lens 11c directs the light from the LED 11b evenly to the entire surface of the LCD 11a. The LCD 11a displays an optical image, and modulates the light supplied from the LED 11b through the lens 11c.

The upper end of the transparent plate 13R has a wedge shape the forward swell of which increases with increasing proximity to rim 20. The box 11d is fixed so as to sandwich the wedge-shaped part from the front and the rear. The light modulated by the LCD 11a is incident on the transparent plate 13R from the upper end and reaches he rear surface. The LED 11b, the lens 11C and the LCD 11a are disposed so that the angle of incidence of the light on the rear surface of the transparent plate 13 exceeds the critical angle, and the light reaching the rear surface is totally reflected. The light reflected at the rear surface is also totally reflected at the front surface, and is totally reflected several times inside the transparent plate 13R to be incident on the combiner 12R. By directing the light to the combiner 12R by reflecting it several times, the transparent plate 13R can be increased in size and decreased in thickness.

The combiner 12R is a reflective hologram element that acts only on light it reflects, and hardly acts on light it transmits. The combiner 12R is set so as to direct the light from the LCD 11a to the right eye E by reflecting it and to enlarge the optical image represented by the light from the LCD 11a. To the eye E, the light from the ambient object transmitted by the transparent plate 13R and the combiner 12R is also directed. To the right eye, the optical image of the ambient object and an enlargement of the optical image of the LCD 11a superimposed on the optical image of the ambient object in the center thereof are provided. To the user's left eye, only the optical image of the ambient object is provided.

A half mirror can be used as the combiner 12R. However, when a half mirror is used, since part of the light from the ambient object and part of the light from the LCD 11a are lost according to the transmittance of the half mirror, a central part of the optical image of the ambient object becomes dark, so that the optical image superimposed thereon also becomes dark. In addition, it is necessary for the half mirror to be curved to enlarge the optical image and it is difficult to manufacture such a half mirror.

On the contrary, the hologram element which has a high wavelength selectivity can be set so as to reflect or transmit light with hardly any loss of light. Although being planar, the hologram element can easily be set so as to enlarge light it reflects or transmits at a desired magnification. The optical image display apparatus 1 using a hologram element having such a characteristic as the combiner 12R is capable of providing an ambient object optical image with no dark part and a bright optical image, and is capable of providing a large optical image although the display portion 11R is small.

Figure 4:
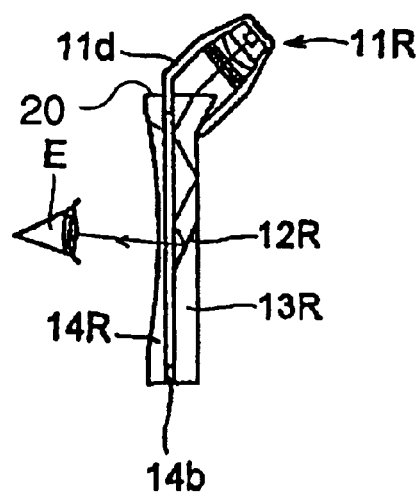
FIG. 4 is a cross-sectional view of the optical image display apparatus according to the first embodiment when the second transparent plate is attached.

The cross sections of the transparent plate 13R and the display portion 11R when the transparent plate 14R is attached are shown in FIG. 4. The transparent plate 14R is attached to the transparent plate 13R with the claws 14a. The upper end of the front surface of the transparent plate 14R abuts the lower end of the box 11d, and the protrusion 14b abuts the lower end of the rear surface of the transparent plate 13, so that the parts of the transparent plates 13R and 14R that direct light to the eye E are separated from each other. Consequently, the condition of the total reflection of light inside the transparent plate 13R is ensured. Although not shown, the transparent plate 14L attached to the transparent plate 13L is also separated from the transparent plate 13L.

The transparent plates 14L and 14R each have an optical power as mentioned above, and the diopter can be adjusted by the optical power. FIG. 4 shows an example in which the transparent plate 14R is a concave lens having a negative optical power so that the apparatus suits a nearsighted person. The optical powers of the transparent plates 14L and 14R are set in accordance with the visual powers of the user's left and right eyes, respectively. The optical powers may be given either to the front surfaces or the rear surfaces of the transparent plates 14L and 14R, or may be given to both of the surfaces. Since the transparent plates 14L and 14R are not in contact with the transparent plates 13L and 13R, it is easy to design the transparent plates 14L and 14R.

The transparent plate 14R situated between the user's eye and the transparent plate 13R acts both on the light from the ambient object transmitted by the transparent plate 13R and on the light from the LCD 11a reflected by the combiner 12R. Therefore, the user can view both the optical image of the ambient object and the optical image clearly. The hologram element used as the combiner 12R can be designed without the need to consider the optical power of the transparent plate 14R.

While an optical image is provided to the user's right eye in the optical image display apparatus 1, an optical image may be provided to the user's left eye. While total reflection is used to direct the light from the display portion 11R to the combiner 12R in the optical image display apparatus 1, a reflecting film may be provided on the surface of the transparent plate 13R so that the light is directed by reflection at the reflecting film. In that case, since it is necessary to allow the light from the ambient object to pass through the reflecting film, a hologram element is used as the reflecting film. In the structure in which a reflecting film is provided on the surface of the transparent plate 13R, although it is not always necessary that the transparent plate 13R and the transparent plate 14R be separated from each other, it is desirable that these be separated to make it easy to design the transparent plates 13R and 14R.

Other embodiments of the present invention will be described. The same or similar elements to the elements described above are designated by the same reference numbers, and overlapping descriptions are omitted.

Figure 5:
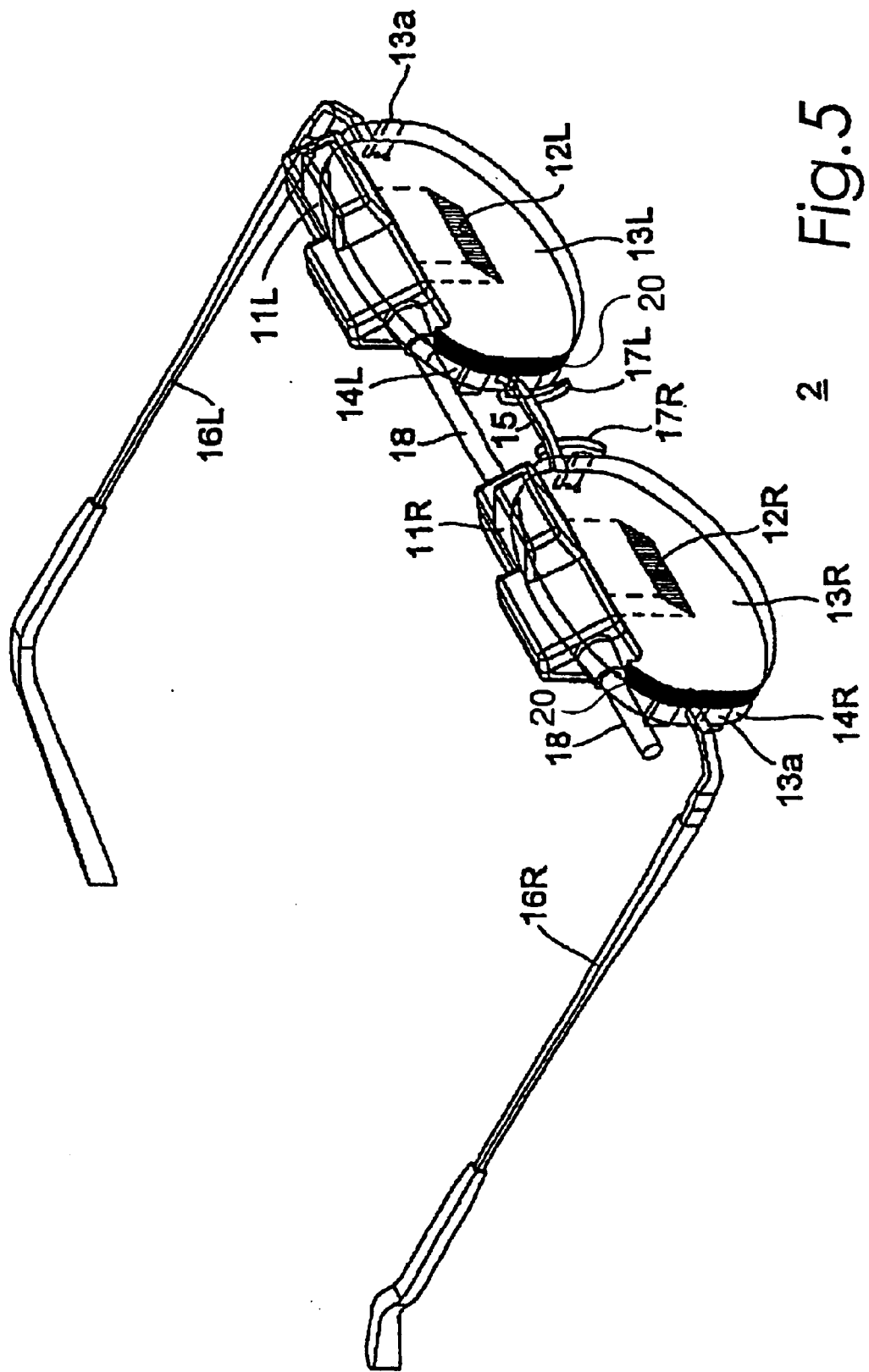
FIG. 5 is a perspective view of an optical image display apparatus according to a second embodiment.

The appearance of an optical image display apparatus 2 according to a second embodiment is shown in FIG. 5. In the optical image display apparatus 2, a combiner 12L is also provided on the transparent plate 13L for the left eye, and a display portion 11L is added so that an optical image is provided to both eyes. The second transparent plates 14L and 14R each having an optical power are connected by the connection 15, and the temples 16L and 16R are attached to the transparent plates 14L and 14R. The transparent plates 14L and 14R are detachably attachable to the first transparent plates 13L and 13R. The claws 14a and the protrusions 14b of the transparent plates 14L and 14R are omitted. Instead, claws 13a and protrusions 13b are provided on the transparent plates 13L and 13R.

Figure 6:
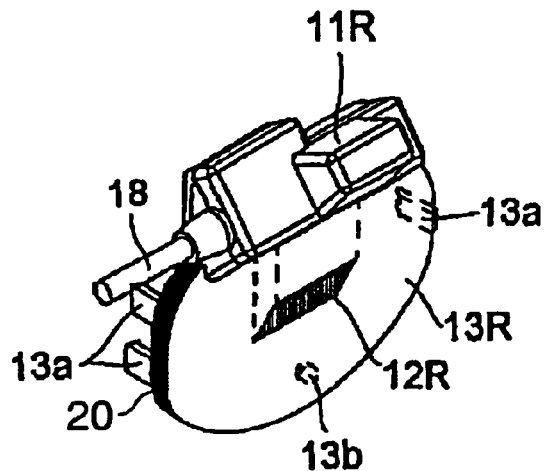
FIG. 6 is a perspective view of a display portion and a first transparent plate of the optical image display apparatus according to the second embodiment.

The appearance of the transparent plate 13R and the display portion 11R is shown in FIG. 6. The claws 13a have the same structure as the claws 14a except that they protrude rearward; and engages with the left and the right ends of the transparent plate 14R. The protrusion 13b is provided at a lower end on the rear surface of the transparent plate 13R.

In the structure of this embodiment, the optical image display apparatus 2 can also be completed by preparing only the transparent plates 13L and 13R provided with the display portions 11L and 11R and the combiners 12L and 12R and combining these with the glasses that the user usually wears. Since the transparent plates 13L and 13R have no optical power, the diopter adjusting function of the glasses works without any trouble. The optical image display apparatus 2 is capable of providing a three-dimensional optical image by displaying optical images with a parallax therebetween on the display portions 11L and 11R.

Figure 7:
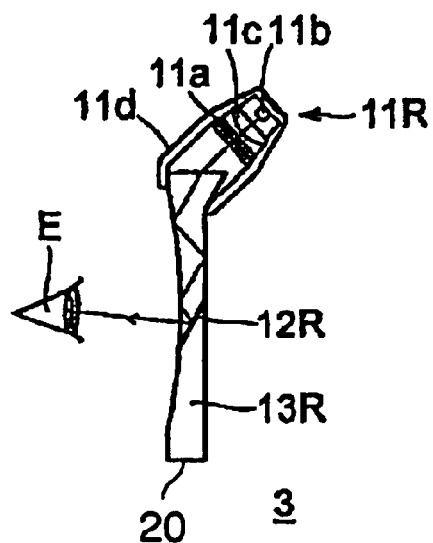
FIG. 7 is a cross-sectional view of an optical image display apparatus according to a third embodiment when a second transparent plate is not attached.

An optical image display apparatus 3 according to a third embodiment will be described. In the optical image display apparatus 3, the first transparent plates 13L and 13R of the optical image display apparatus 1 of the first embodiment each have an optical power. The cross sections of the transparent plate 13R and the display portion 11R when the transparent plate 14R is not attached are shown in FIG. 7. FIG. 7 shows an example in which the transparent plate 13R is a concave lens having a negative optical power so that the apparatus suits a nearsighted person. While the rear surface of the transparent plate 13R is curved in this example, the front surface or both the front and the rear surfaces may be curved to give the transparent plate 13R an optical power.

When the front surface of the transparent plate 13R is curved, the optical power thereof acts only on the light from the ambient object, so that of the light directed to the user's eye, the light from the ambient object and the light from the LCD 11a are acted upon differently. However, by setting the hologram element serving as the combiner 12 in consideration of the curvature of the front surface of the transparent plate 13R, the difference can be canceled out so that the light from the LCD 11a is acted upon by the same optical power as the light from the ambient object. When only the rear surface of the transparent plate 13R is curved, the hologram element can be set without the need to consider the curvature of the rear surface.

Figure 8:
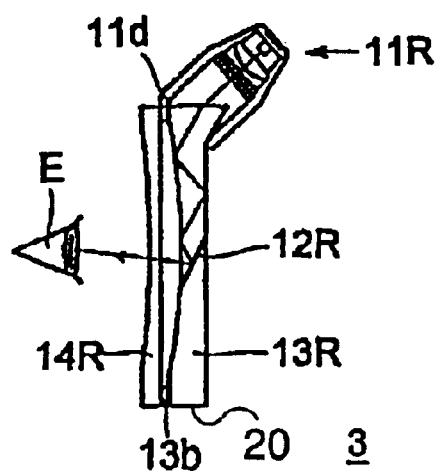
FIG. 8 is a cross-sectional view of the optical image display apparatus according to the third embodiment when the second transparent plate is attached.

The optical powers of the transparent plates 13L and 13R may be strong enough for correcting the user's visual power, or may have different strengths therefrom. When the optical powers of the transparent plates 13L and 13R have necessary and sufficient strengths, the transparent plates 14L and 14R having optical powers are unnecessary. When the optical image display apparatus 3 has this structure, the claws 13a and the protrusions 13b of the transparent plates 13L and 13R are omitted. When the optical powers of the transparent plates 13L and 13R have strengths other than the necessary and sufficient strengths, by correcting the excess or the deficiency by the optical powers of the transparent plates 14L and 14R, the overall strengths can be made necessary and sufficient. The cross section when the transparent plate 14R is attached to correct the optical power of the transparent plate 13R is shown in FIG. 8.

When some transparent plates having optical powers somewhat largely different thereamong are prepared as the transparent plates 13L and 13R and some transparent plates having optical powers slightly different thereamong are prepared as the transparent plates 14L and 14R, by combining them, a multiplicity of optical image display apparatuses 3 having overall optical powers slightly different thereamong are obtained. In the structure in which optical powers are given only to the transparent plates 14L and 14R or only to the transparent plates 13L and 13R, in order for the optical image display apparatus 3 to suit many persons, it is necessary to prepare a multiplicity of transparent plates having different optical powers as the transparent plates 14L and 14R or the transparent plates 13L and 13R. However, the necessity is obviated by giving optical powers both to the transparent plates 14L and 14R and to the transparent plates 13L and 13R.

While the temples 16L and 16R and the nosepieces 17L and 17R are used as mount members in the above-described embodiments, mount members of a different structure may be provided, or mount members may be omitted so that the apparatus is held manually. While the transparent plates 14L and 14R are attached to the transparent plates 13L and 13R with the claws 14a and 13a, the transparent plates 14L and 14R may be attached to the transparent plates 13L and 14R, the display portions 11L and 11R or the like with a different structure. In that case, it is also desirable that the transparent plates 14L and 14R be detachably attachable.

With the optical image display apparatuses according to the embodiments, since the diopter can be adjusted by the optical power of either the diopter adjusting member or the holding member that holds the combiner or by the optical powers of both of these members, even a person wearing glasses in daily life can view the optical image of the ambient object and an optical image clearly.

Particularly, in the structure in which both the diopter adjusting member and the holding member have optical powers, since it is possible to roughly adjust the diopter with the holding member and finely adjust the diopter with the diopter adjusting member, a holding member of the same structure can be used as the holding member for a plurality of apparatuses used by different persons. Thus, manufacturing efficiency is excellent.

In the structure in which the diopter adjusting member has substantially the same outside shape as the holding member and coincides with substantially the entire area of the holding member, the user can view all parts of the optical image of the ambient object clearly and the appearance of the entire apparatus is enhanced.

When the diopter adjusting member is detachably attachable to the display unit, only by preparing diopter adjusting members having different optical powers, the apparatus can be made suitable for a plurality of persons by use of a display unit of the same structure. When the holding member has no optical power, it is possible to combine the display unit and the glasses that the user usually wears into a complete apparatus, so that the user's glasses can be used efficiently.

When the holding member and the diopter adjusting member are separated from each other, the optical design of these members is easy.

When a hologram element is used as the combiner, a bright optical image can be provided, and a large optical image can be provided although the display portion is small.

In the structure in which the holding member allows the light from the display portion to enter from an end and directs the light to the combiner by reflecting it at at least one of the opposing two surfaces thereof, the light from the ambient object can reliably be prevented from being intercepted by the display portion by disposing the display portion in the periphery of the holding member. In addition, the holding member is easily increased in size and decreased in thickness.

According to the structure having the mount members, an apparatus with excellent usability is obtained.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image display apparatus comprising:
    a display portion displaying an optical image;
    a combiner reflecting light from said display portion and transmitting light from an ambient object;
    a holding member holding said combiner, said holding member having a transparent plate-form; and
    a diopter adjusting member having a transparent plate-form, and having an optical power and situated between a user's eye and said holding member,
    wherein said image display apparatus is used with said combiner situated in front of the user's eye, and provides an enlargement of the optical image displayed on the display portion, so as to be superimposed on an optical image of the ambient object.

2. An image display apparatus as claimed in claim 1, wherein a perimeter of said diopter adjusting member has substantially the same shape as a perimeter of said holding member.

3. An image display apparatus as claimed in claim 1, wherein said diopter adjusting member is detachably attachable to said holding member.

4. An image display apparatus as claimed in claim 1, wherein said holding member and said diopter adjusting member are separated from each other.

5. An image display apparatus as claimed in claim 1, wherein said combiner is a hologram element.

6. An image display apparatus as claimed in claim 1, wherein said holding member is defined by two surfaces and an edge, and wherein said display portion is disposed at an angle to a first one of said surfaces so that light from said display portion enters said holding member substantially from said edge, and the light is directed to said combiner by reflecting from at least said first surface.

7. An image display apparatus as claimed in claim 1, wherein a mount member is provided that is supported by the user's head and supports said display units so that said combiner is situated in front of the eye.

8. An image display apparatus as claimed in claim 1, wherein said diopter adjusting member subtends a field of view of the user's eye substantially the same as the field of view subtended by said holding member.

9. An optical image display apparatus comprising:
    a display portion displaying an optical image;
    a combiner reflecting light from said display portion and transmitting light from an ambient object; and
    a holding member holding said combiner, said holding member having a transparent plate-form, and having an optical power,
    wherein said image display apparatus is used with said combiner situated in front of the user's eye, and provides an enlargement of the optical image displayed on the display portion, so as to be superimposed on an optical image of the ambient object.

10. An optical image display apparatus as claimed in claim 9, wherein said combiner is a hologram element.

11. An optical image display apparatus as claimed in claim 8, wherein said holding member is defined by two opposing surfaces, and wherein light from said display portion enters said holding member at an angle to at least one of said opposing surfaces so that the light is directed to said combiner by reflecting off of the at least one of said opposing surfaces.

12. An optical image display apparatus as claimed in claim 8, wherein a mount member is provided that is supported by the user's head and supports said display portion and said holding member so that said combiner is situated in front of the eye.

13. An optical image display apparatus as claimed in claim 9, wherein a diopter adjusting member having a transparent plate-form, and having an optical power and situated between a user's eye and said holding member.

14. An optical image display apparatus as claimed in claim 9, wherein said display portion, said holding member, and said combiner are juxtaposed so that said light from said display portion enters said holding member at an angle to a surface of said holding member and is directed to said combiner by internal reflections from said surface of said holding member.

15. An image display apparatus comprising:
- a first lens having a shape defined by two surfaces and a rim;
- a display disposed at the rim of said first lens at an angle to both of said two surfaces so that light from the display portion is internally reflected by said two surfaces;
- a combiner disposed within said first lens so as to direct said internally reflected light to an eye of a user; and
- a second lens removably coupled to said first lens, wherein said second lens is spaced apart from said first lens and disposed between said first lens and said eye of the user.

16. The image display apparatus of claim 15, wherein said first lens has an optical power selected from a first predetermined plurality of powers, for providing a coarse correction for the visual power of the user.

17. The image display apparatus of claim 15, wherein said second lens has an optical power selected from a second predetermined plurality of optical powers, for providing a fine correction for the visual power of the user.

18. The image display apparatus of claim 15, wherein said first lens has an optical power selected from a first predetermined plurality of powers, and said second lens has an optical power selected from a second predetermined plurality of optical powers, so that the first and second lenses together provide correction for myopia or hyperopia of the user.

19. The image display apparatus of claim 15, wherein said second lens comprises a pair of eyeglasses and said first lens and display are disposed from said eyeglasses.

20. The image display apparatus of claim 19, wherein said second lens is substantially the same size as the first lens.

21. The image display apparatus of claim 19, wherein said first and second lenses subtend substantially equal fields of view.

22. The image display apparatus of claim 15, wherein said rim further comprises a flared portion, and said display is disposed from said flared portion of said rim.

23. The image display apparatus of claim 15, wherein said first lens has zero power.

24. The image display apparatus of claim 15, wherein said first and second lenses are spaced apart by a film, and the film causes the internal reflection within the first lens.

* * * * *